No. 700,094. Patented May 13, 1902.
BEN AMI SELPH.
HARVESTER REEL.
(Application filed Oct. 7, 1901.)
(No Model.) 2 Sheets—Sheet 1.

WITNESSES:
J. H. Brophy
A. H. Davis

INVENTOR
Ben ami Selph
BY
ATTORNEYS

No. 700,094. Patented May 13, 1902.
BEN AMI SELPH.
HARVESTER REEL.
(Application filed Oct. 7, 1901.)
(No Model.) 2 Sheets—Sheet 2.
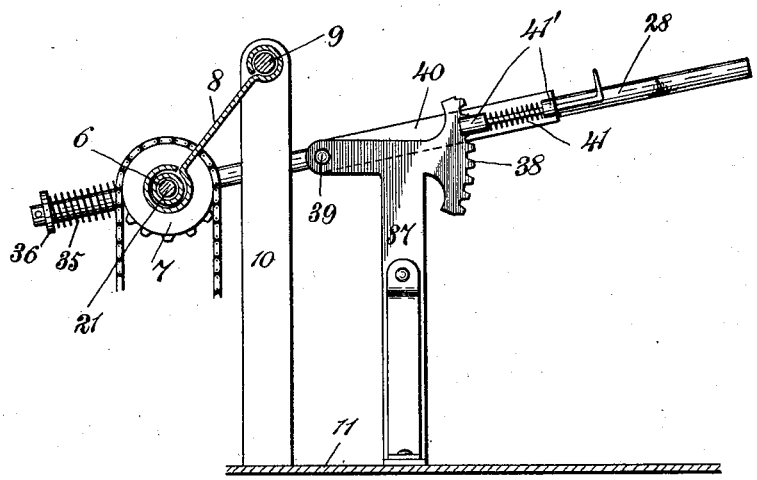
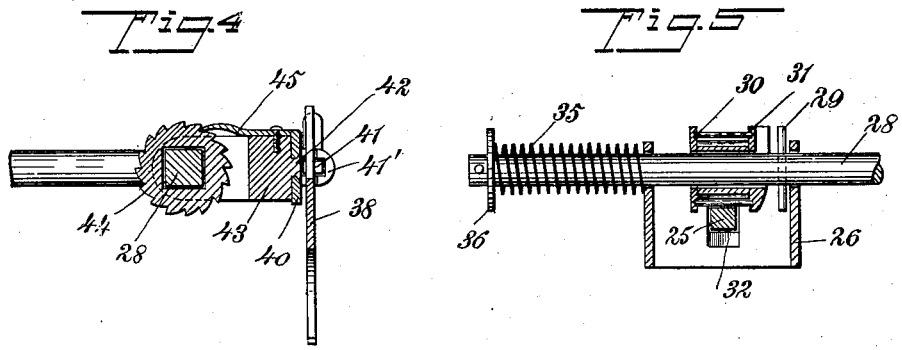
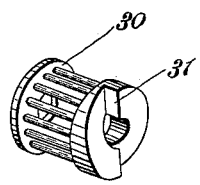
WITNESSES:
J. A. Brophy
A. H. Davis
INVENTOR
Ben ami Selph
BY
Attorneys

UNITED STATES PATENT OFFICE.

BEN AMI SELPH, OF HILLSBORO, OHIO.

HARVESTER-REEL.

SPECIFICATION forming part of Letters Patent No. 700,094, dated May 13, 1902.

Application filed October 7, 1901. Serial No. 77,807. (No model.)

*To all whom it may concern:*

Be it known that I, BEN AMI SELPH, a citizen of the United States, and a resident of Hillsboro, in the county of Highland and State of Ohio, have invented a new and Improved Harvester-Reel, of which the following is a full, clear, and exact description.

My invention relates to reels for harvesters, and has for its object to provide a reel the diameter of which may be varied at will, its parts being firmly held in all positions to which it may be adjusted, and means for automatically expanding the reel to its normal size whenever the operator so desires. Such a reel possesses many advantages over those in common use, as it may be easily and quickly adjusted so as to prevent breakage by obstacles above or below the reel and may be folded into a very small compass to allow easy access to the sickle-bar and to many other parts of the machine which often need attention, and, further, when the machine is ready for housing the reel can be folded and set in a corner. The reel being foldable also makes it very convenient in moving the machine from one field to another.

The drawings show one embodiment of my invention, and the claims define the actual scope thereof.
Reference is to be had to the accompanying drawings, forming a part of this specification, in which similar characters of reference indicate corresponding parts in all the figures.

Figure 1:
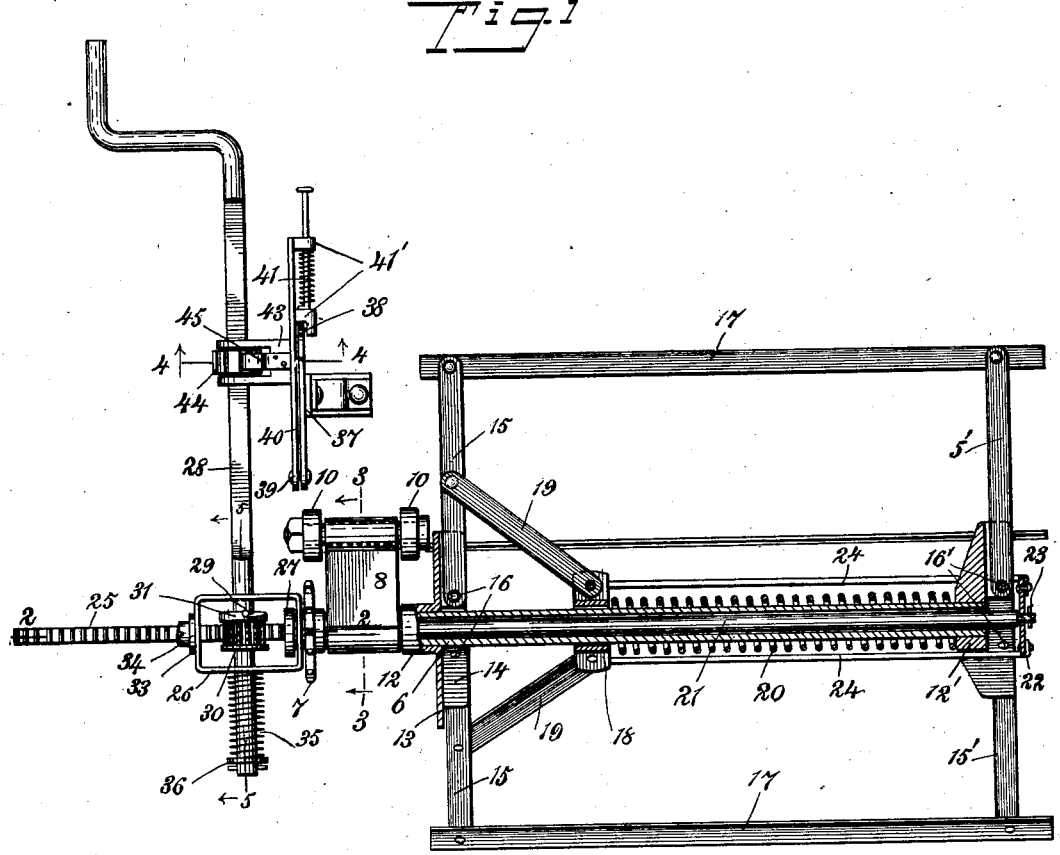
Figure 2:
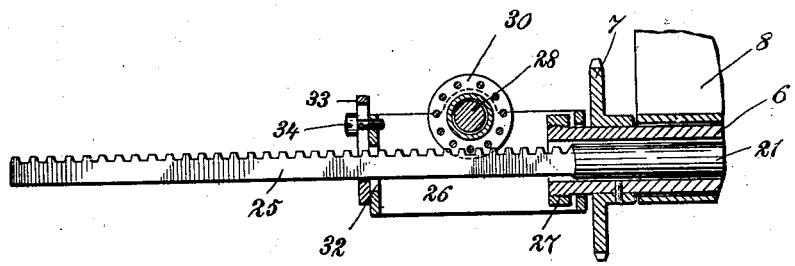

Figure 1 is a plan view, partly in section, of the entire device. Fig. 2 is an enlarged section on line 2 2 of Fig. 1. Fig. 3 is an enlarged section on line 3 3 of Fig. 1. Fig. 4 is an enlarged section on line 4 4 of Fig. 1. Fig. 5 is an enlarged section on line 5 5 of Fig. 1, and Fig. 6 is a detail perspective view of a barrel-pinion employed.

The reel-shaft 6 is a hollow shaft provided with a driving sprocket-wheel 7 and journaled in a bearing-link 8, which swings upon a rod 9, supported by standards 10, rising from the frame 11.

Fixed to the hollow shaft 6 are the hubs 12 and 12'. The hub 12 has a web 13 and pairs of radial flanges 14, between which the radial bars 15 are pivoted at 16. The hub 12' consists of a spider having radial arms with grooves, in which the bars 15' are pivoted at 16'. The bars 15 and 15' are pivoted at their outer ends to the cross-bars or beaters 17. A sleeve 18 is loosely mounted on the shaft 6, and pivoted at one end to the radial bars 15 and at the other to the sleeve 18 are the links 19. Encircling the shaft 6 and abutting against the hub 12' and the sleeve 18 is the coil-spring 20. It is evident that when the sleeve is caused to move toward the free end of the shaft 6—that is, to the right in Fig. 1— it draws on the links 19, and the bars 15 and 15' are thereby turned on their pivots 16 and 16', and the diameter of the reel is thereby diminished, the spring at the same time being compressed. When the sleeve is released, the spring operates to return the sleeve to its initial position.

The mechanism for operating the sliding sleeve consists of a rod 21, which passes through the hollow shaft. Its outer end is of reduced diameter, forming a shoulder, and on the reduced portion is mounted a plate 22, retained on the rod by a pin 23. Rods 24 are secured at one end to the plate 22 and at the other end to the sleeve 18. The outer end of the rod 21 is shown as integral with a rack 25. A frame 26 is loosely mounted on the shaft 6 and retained thereon by a nut 27, threaded on the end of said shaft. A crank-shaft 28 passes through bearings in the frame 26 and carries a clutch member 29, herein shown as a pin. Loosely mounted on the crank-shaft 28 and within the frame 26 is a barrel-pinion 30, one end of which is formed into a clutch member 31 to coact with the clutch member 29. The rack 25 passes through an opening 32 in the outer end of the frame 26 and is supported and held in engagement with the pinion 30 by a slotted link 33, which is adjustably supported on the frame 26 by means of a screw 34.

One end of the shaft 28 extends beyond the frame 26 and is encircled by a coil-spring 35, which abuts against the frame at one end and against a washer 36 at the other end. The other end of the shaft is made vertically adjustable, and the shaft is held against rotation by the mechanism now to be described.

A standard 37 is secured to the frame 11 of the harvester and carries a locking-rack 38. A bar 40 is pivoted to said standard at 39 and carries a spring-locking dog 41, moving in the guides 41'. Pivotally supported at 42 on the bar 40 is a yoke 43, through the arms of which the shaft 28 passes, the middle portion of this shaft for a considerable length being angular in cross-section. A ratchet-wheel 44 is slidably mounted on said shaft between the arms of the yoke 43, and its teeth are engaged by a spring-pawl 45. The sliding connection between the shaft 28 and the yoke 43 and ratchet-wheel 44 permits the reel-shaft 6 to be raised or lowered by any suitable mechanism attached to the frame of the harvester, the link 8 turning on the rod 9 as a center.

It will be seen that when the shaft 28 is rotated, the clutch members 29 and 31 being held in engagement by the spring 35, the pinion 30 is caused to rotate, and thereby the rack 25 and rod 21 are moved outward through the hollow shaft 6, thereby causing the reel to fold and compressing the spring 20. The reel is held in any position of adjustment by the ratchet-wheel 44 on the shaft 28, the spring 20 always tending to expand the reel. When it is desired to expand the reel, the shaft 28 is moved backward longitudinally, thereby releasing the clutch member 31 and allowing the pinion 30 to rotate freely, whereupon the spring 20 causes the reel to expand, as previously described.

Having thus described my invention, I claim as new and desire to secure by Letters Patent—

1. In a harvester, the combination with a collapsible reel, means for expanding the same, and a slidable rack, of a frame mounted on the reel-shaft, and having the rack fitted therein, a pinion in mesh with the rack, and an adjusting-rod fitted in the frame and clutched to the pinion, as set forth.

2. In a harvester, the combination with a reel-shaft, a spring-collapsed reel, and a rack for expanding the reel, of a slidable and revoluble adjusting-rod, a pinion in mesh with said rack and clutched to said adjusting-rod, and means for holding said rod and the pinion in operative relation to each other and to the rack.

3. In a harvester, the combination with a reel-shaft, a spring-collapsed reel, and a rack for expanding the reel, of a pivoted hanger in which the reel-shaft is journaled, a lever having a pivoted yoke, an adjusting-rod slidably fitted in said yoke and a pinion clutched to the adjusting-rod and meshing with the reel-expanding rack.

4. In a harvester, the combination with a reel-shaft, a spring-collapsed reel, and a rack for expanding the reel, of a frame on the reel-shaft, an adjusting-rod revolubly fitted in said frame, a spring acting against said rod to hold it in one position, and a pinion clutched to the rod and meshing with said rack, whereby the rod may be drawn against the energy of the spring and released from engagement with the pinion.

5. In a harvester, the combination of a pivoted hanger, a collapsible reel having its shaft mounted therein, an expanding-rack in operative relation to the reel, a swiveled yoke, an adjusting-rod having a polygonal portion fitted slidably in the yoke, a ratchet on said polygonal portion of the rod, a detent engaging said ratchet, and a pinion clutched to the adjusting-rod and meshing with the rack.

6. In a harvester, the combination with a reel-shaft, a reel, and a rack, of a frame connected to the reel-shaft, a guide-plate engaging with the rack and fastened adjustably to said frame, an adjusting-rod fitted in the frame, and a pinion clutched to said rod and meshing with the rack.

7. In a harvester, the combination with a reel-shaft, a reel, and a rack, of a frame fitted to the reel-shaft, a slidable and revoluble rod fitted in the frame and having a clutch-pin, a pinion loose on the rod, in engagement with the rack, and having a clutch-face adapted for engagement with the clutch-pin, and a spring normally impelling the rod for its clutch-pin to make the pinion fast with said rod.

In testimony whereof I have signed my name to this specification in the presence of two subscribing witnesses.

BEN AMI SELPH.

Witnesses:
AUTA N. GROTH,
A. D. WIGGINS.